United States Patent [19]
Eberle et al.

[11] Patent Number: 5,155,446
[45] Date of Patent: Oct. 13, 1992

[54] DIGITAL FSK DEMODULATOR

[75] Inventors: Gernot Eberle, Lanark; Guy J. Chaput, Pakenham, both of Canada

[73] Assignee: Northern Telecom Limited, Montreal, Canada

[21] Appl. No.: 791,829

[22] Filed: Nov. 14, 1991

[51] Int. Cl.⁵ ............................................. H04L 27/14
[52] U.S. Cl. ..................................... 329/300; 329/303; 375/80; 375/88
[58] Field of Search ............... 329/300, 301, 302, 303; 375/80, 82, 88

[56] References Cited

U.S. PATENT DOCUMENTS 4,568,882  2/1986  Single ................................. 329/301
4,752,742  6/1988  Akaiwa .............................. 329/302
4,785,255  11/1988  Lucak et al. ...................... 329/303

Primary Examiner—Siegfried H. Grimm
Attorney, Agent, or Firm—Yoshiharu Toyooka

[57] ABSTRACT

Digital FSK demodulators to be used in the telephone environment are disclosed. The demodulator according to one embodiment uses the sequential processing of a digital signal encoded in the fractional two's complement numeric representation. The use of multipliers is largely eliminated, thus enabling extensive use of simple shift registers and adders. Consequently the hardware complexity requirement is greatly reduced, thus resulting in very low cost products.

9 Claims, 7 Drawing Sheets

DIGITAL FSK DEMODULATOR

FIELD OF THE INVENTION

The present invention relates to FSK demodulators and, in particular, is directed to medium speed FSK demodulators which use digital signal processing and are economical to manufacture.

BACKGROUND OF THE INVENTION

Most of the time, the voice-grade telephone line cannot be used directly to send digital signals because its bandwidth is limited. However the line can be used to send digital signals if the signals are first converted into analog signals whose frequencies fit within the voice-grade line bandwidth. Such a conversion is carried out at a data communication adapter commonly known as a modulator-demodulator or a "modem" for short. A modem both converts digital data from a digital computing machine into an analog signal suitable for transmission over voice-grade telephone lines, and also converts a received analog signal into digital data for use by a digital computing machine. Among various modulation techniques one type of the Frequency Modulation (FM) known as Frequency Shift Keying (FSK) is very popular for modems operating at a medium or low speed, such as at bit rates less than 1800 bps (bits per second). In FSK, two different frequency tones are used to represent "zero" (or space) and "ones" (or mark) bits. When a "one" bit is sent to the modem, a low frequency tone is output to the telephone line. When a "zero" bit is sent to the modem, a high frequency tone is produced. The FSK signal is coherent, that is to say, the mark and space frequencies follow each other's phase continuously. Typically for the 1200 baud transmission, the mark frequency is 1200 Hz and the space frequency is 2200 Hz.

U.S. Pat. No. 4,568,882 (Single), issued Feb. 4, 1986, describes a digital FSK demodulator which uses modified mark and space filters to produce mark and space filter outputs. The outputs are rectified and compared with one another at a comparator to generate a baseband signal. U.S. Pat. No. 4,752,742 (Akaiwa), issued Jun. 21, 1988, teaches a FSK signal demodulator with a quadrature detector. The demodulator includes, in addition to the quadrature detector, a local oscillator and a logic circuit. The local oscillator has an oscillation frequency substantially equal to the centre frequency of the received signal to produce a baseband signal in a quadrature phase relationship. The baseband signal is produced as an output of the logic circuits, depending upon whether the received FSK signal frequency is higher or lower than the local oscillator frequency. U.S. Pat. No. 4,785,255 (Lucak et al), issued Nov. 15, 1988, mentions a digital FSK signal demodulator which contains a master clock for generating a plurality of pulses during each half of the bit interval of the FSK signal. A detector counts the number of master clock pulses during each bit interval to produce the baseband signal. These techniques perform well enough for demodulation of the FSK signals and they are essentially all digital in operation. However they all require a substantial amount of costly digital components.

OBJECTS OF THE INVENTION

It is therefore an object of the present invention to provide digital demodulators which are simple and economical to manufacture.

It is another object of the present invention to provide digital demodulators which require mainly simple and well proven digital components.

It is yet a further object of the present invention to provide digital demodulators which are reliable in response and performance.

SUMMARY OF THE INVENTION

Briefly stated the present invention is directed to a digital FSK demodulator for a PCM coded digital signal representing baseband information of a FSK analog signal containing mark and space frequency components. The demodulator comprises a high pass filter for filtering out low frequency components of the digital signal. A quadrature phase detector is provided to detect the mark and space frequency components of the digital signal by detecting their phase shift in relation to a sampling frequency of the digital signal and to produce a digital detector signal. It further includes a low pass filter for filtering out high frequency components of the digital signal to produce a processed digital signal indicating the baseband information in digital form.

In a further embodiment of the present invention the PCM coded digital signal is coded using the fractional two's complement number system. The demodulator further comprises a parallel shift register for receiving the PCM coded digital signal and for outputting the received digital signal sequentially in a serial bit stream to the high pass filter in the order of the least significant bit first to the most significant bit last.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS

Figure 1:
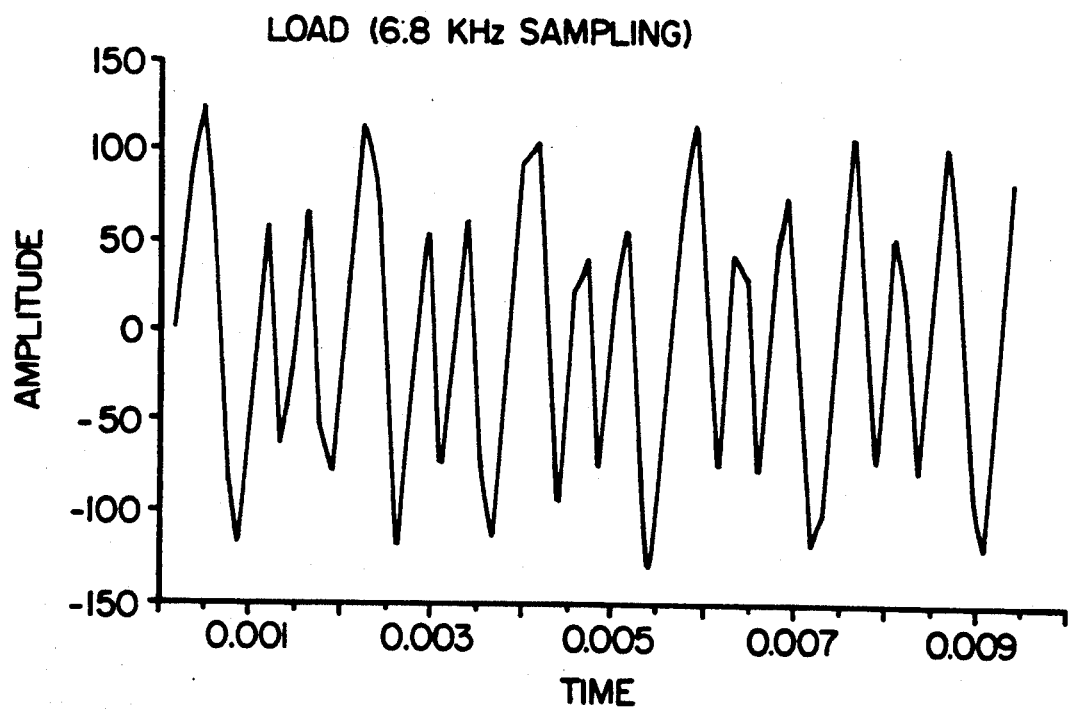
FIG. 1 is a time domain illustration of a FSK signal sampled at 6800 Hz.
Figure 2:
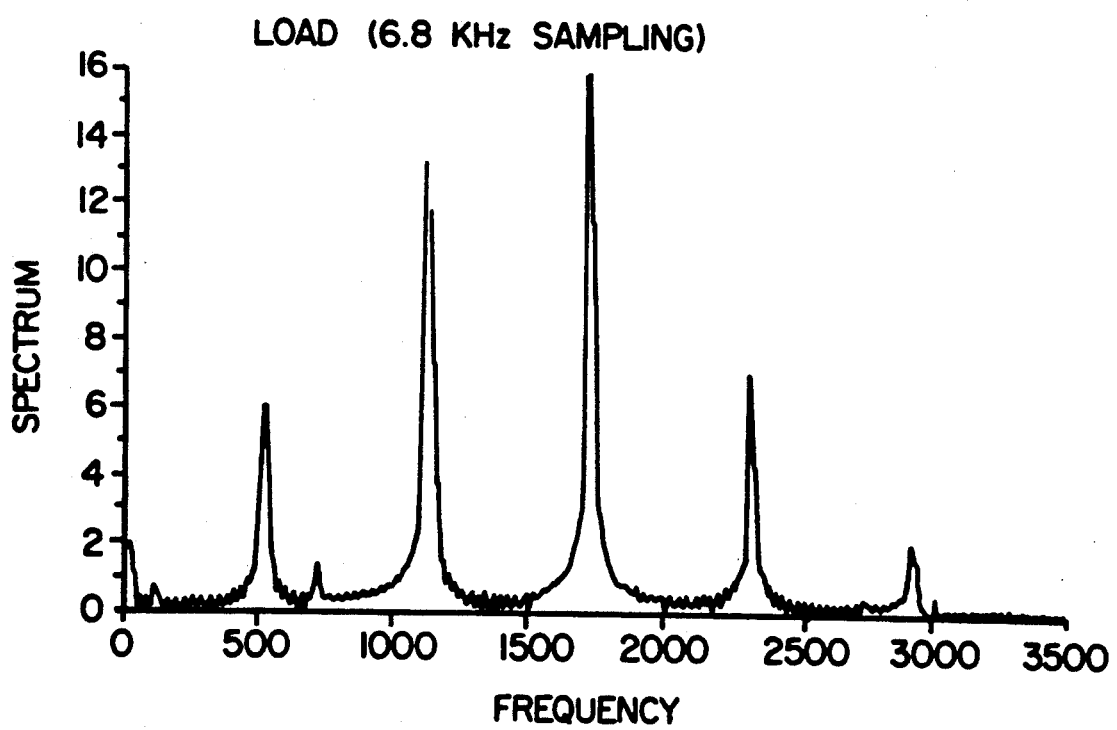
FIG. 2 is a frequency domain illustration of the same signal.

Now referring to the accompanying drawings, a new 1200 baud digital demodulator is described as one of the preferred embodiments of the present invention. For a typical digital modem operation in the telephone environment at 1200 baud, a received analog FSK data stream is converted to a PCM coded FSK sample stream, sampled at a certain sampling frequency. In this embodiment 6800 Hz is chosen as the sampling frequency. FIG. 1 shows, in the time domain, a typical received analog FSK data stream with an alternating mark and space, sampled at 6800 Hz. The data stream has been transmitted through the telephone line and it is therefore evident that the higher frequencies are of lower amplitude than the lower frequencies. This is because the telephone loop acts as a low pass filter. FIG. 2 shows the FSK stream in the frequency domain. The same loop effect is seen here. The higher frequency sideband is more attenuated than the lower frequency sideband. This causes signal distortion. It is observed here that most of the energy is concentrated in three peaks: the centre peak at 1700 Hz, the lower frequency sideband peak at 1100 Hz and the higher frequency sideband peak at 2300 Hz. The centre frequency of 1700 Hz represents the arithmetic mean of the two FSK frequencies (the mark frequency of 1200 Hz and the space frequency of 2200 Hz). The sideband peaks are separated by 1200 Hz and this represents the bit rate of 1200 baud.

Because the FSK data stream contains an alternating mark-space sequence in this example, the signal energy, as shown in FIG. 2, is concentrated in three peaks. A random mark-space sequence will distribute the signal energy between the lower frequency and higher frequency sideband peaks more evenly. The alternating mark-space sequence is used for illustration purpose only.

Sampled FSK data streams are typically encoded using the two's complement numeric representation. However other numeric representations are possible to carry the same information. Among them, a fractional numeric representation is closed under multiplication and so is preferred to an integer numerical representation. Also, the required numeric representation must represent negative numbers. After considering all options the fractional two's complement numeric system is selected. The present invention makes use of this concept together with sequential processing of PCM data stream which has resulted in a new, more economical, way of hardware implementation. The present invention uses a fixed-point numeric representation because it is much easier to set up than a floating-point numeric representation. A sufficiently large word length is required to overcome the limitation in dynamic range. The fractional two's complement uses the general form of either, $$x = -x_0 + \sum_{i=1}^{i=b} x_i * 2^{-i}$$

or $$-x = -(1 - x_0) + \sum_{i=1}^{i=b} (1 - x_i) * 2^{-i} + 2^{-b}$$

The system is not closed under addition (or subtraction=negative addition). This still will not be much of a problem most of the time. When adding a sequence of numbers whose sum is correct, partial results may overflow but the final result is still correct.

Figure 3:
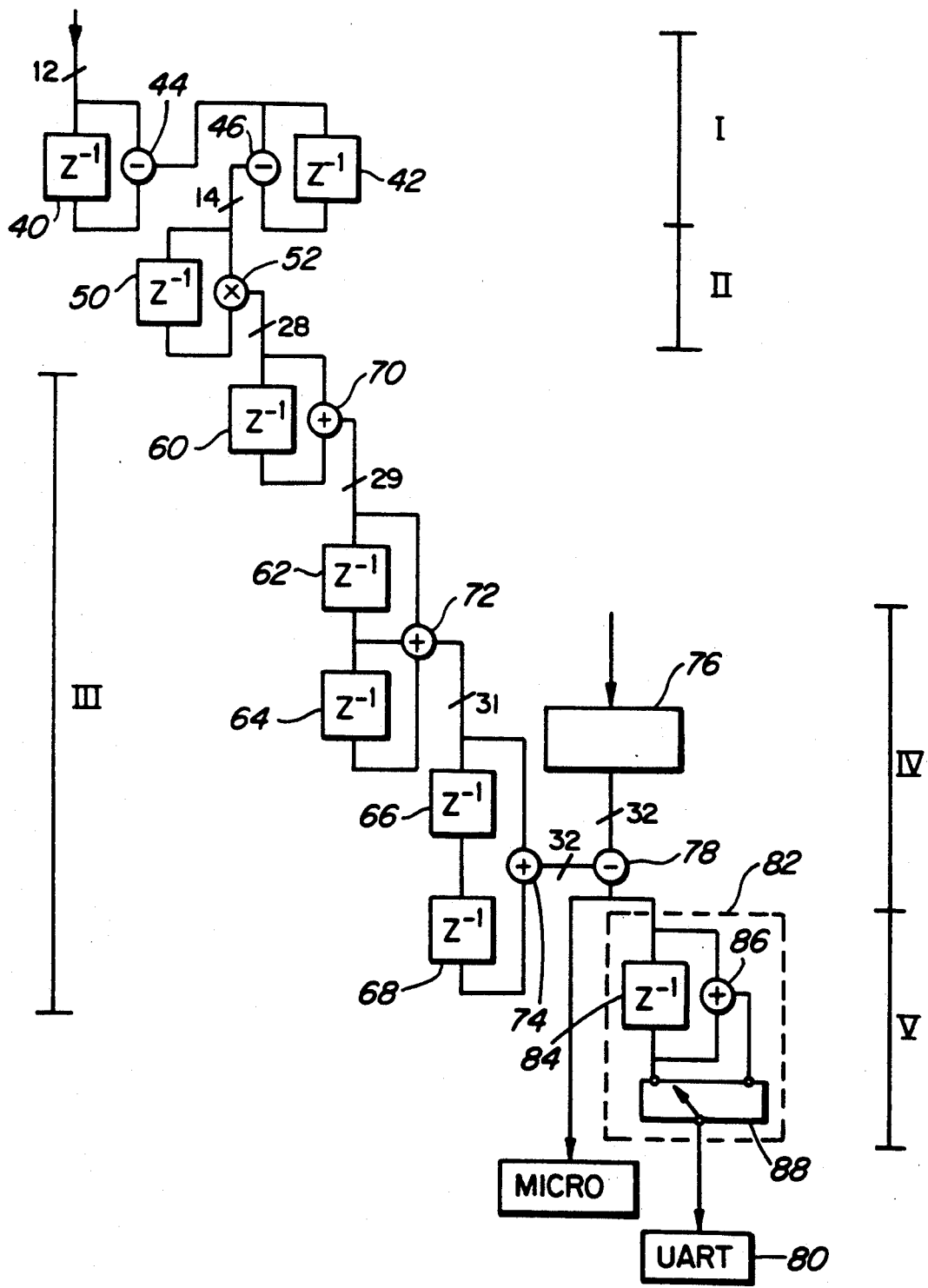
FIG. 3 is a block diagram of a demodulator according to one embodiment of the invention.

FIG. 3 shows in the block diagram a digital FSK demodulator in a basic configuration. The demodulator is made up roughly in five stages: high pass filter, quadrature phase detector, low pass filter, offset generation and sampling doubler.

Figure 4:
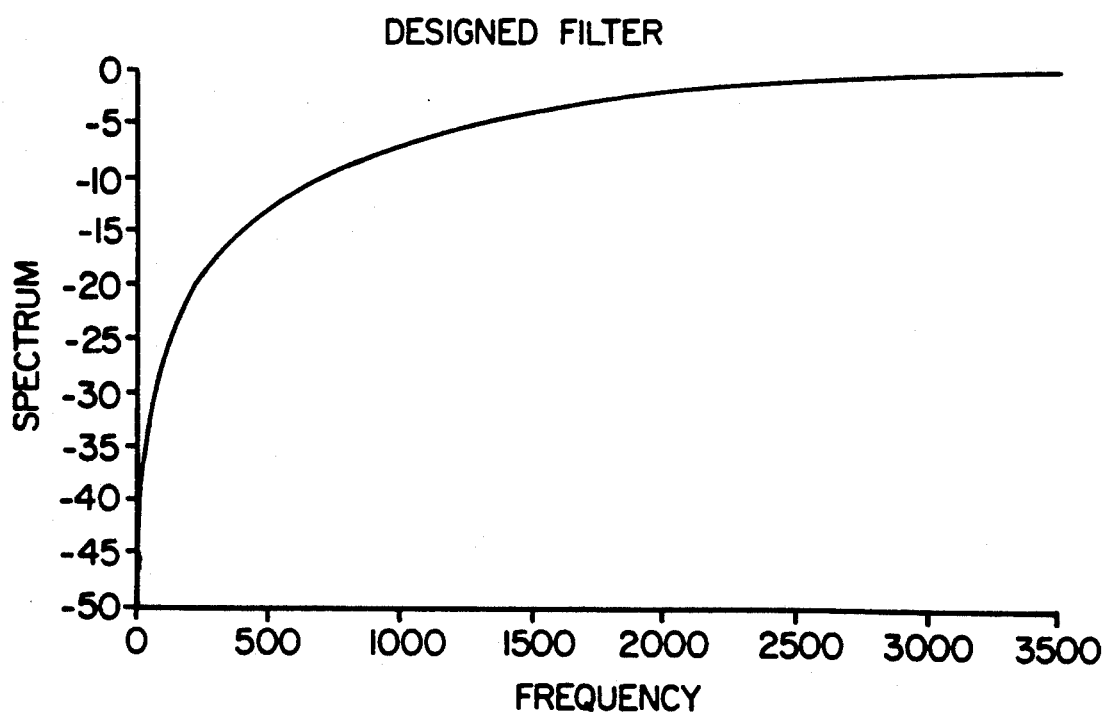
FIG. 4 is a graph showing designed frequency response characteristics of the high pass filter.
Figure 5:
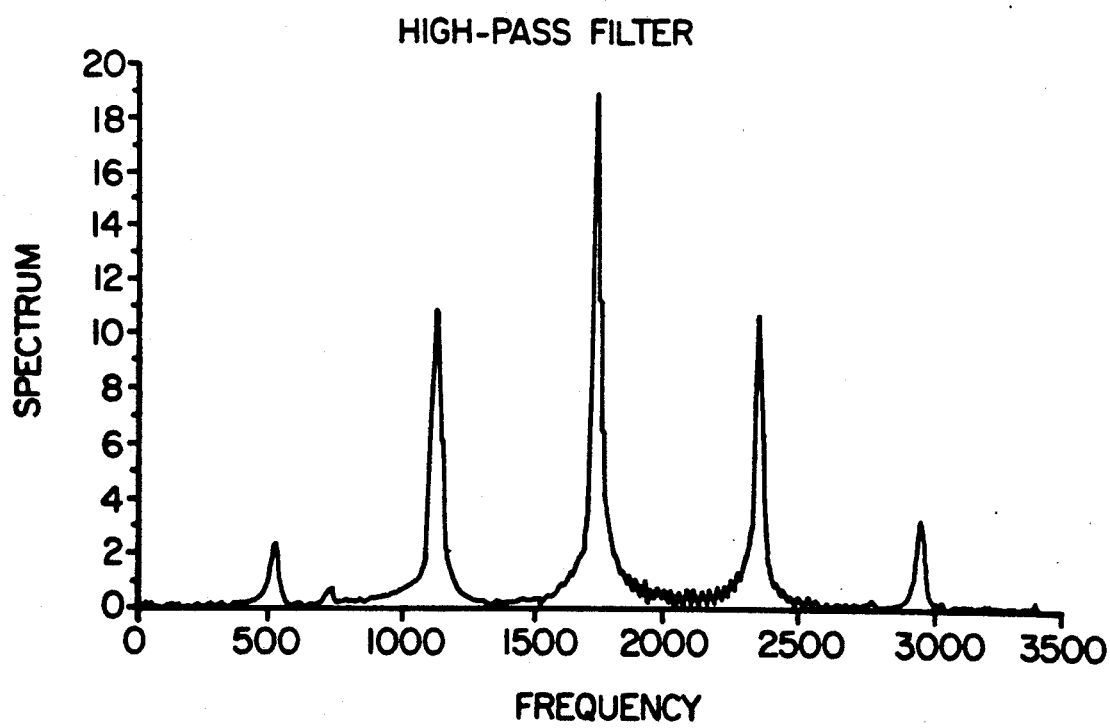
FIG. 5 shows an output of the high pass filter in the frequency domain of the FSK signal of FIG. 1.

The high pass filter is on stage I and is made up of two unit delays 40, 42 and subtractors (negative adders) 44, 46 and will block dc from an input PCM signal and attenuate low frequencies. The input signal is indicated as a 12 bit signal as an example in this embodiment and the Figure further shows changes in the bit number of the signal as it is being processed at later stages. The filter also will equalize the side bands on long telephone loops. The filter's frequency response is shown in FIG. 4. DC is totally blocked and the attenuation at 60 Hz is −60 dB with respect to the Nyquist frequency. The attenuation at the lower sideband is −14.3 dB and the attenuation at the upper sideband is −2.3 dB. Therefore, the higher sideband is attenuated by −12 dB with respect to the lower sideband. This will compensate for the sideband distortion on long loops. The output of the high-pass filter is shown in FIG. 5.

Figure 6:
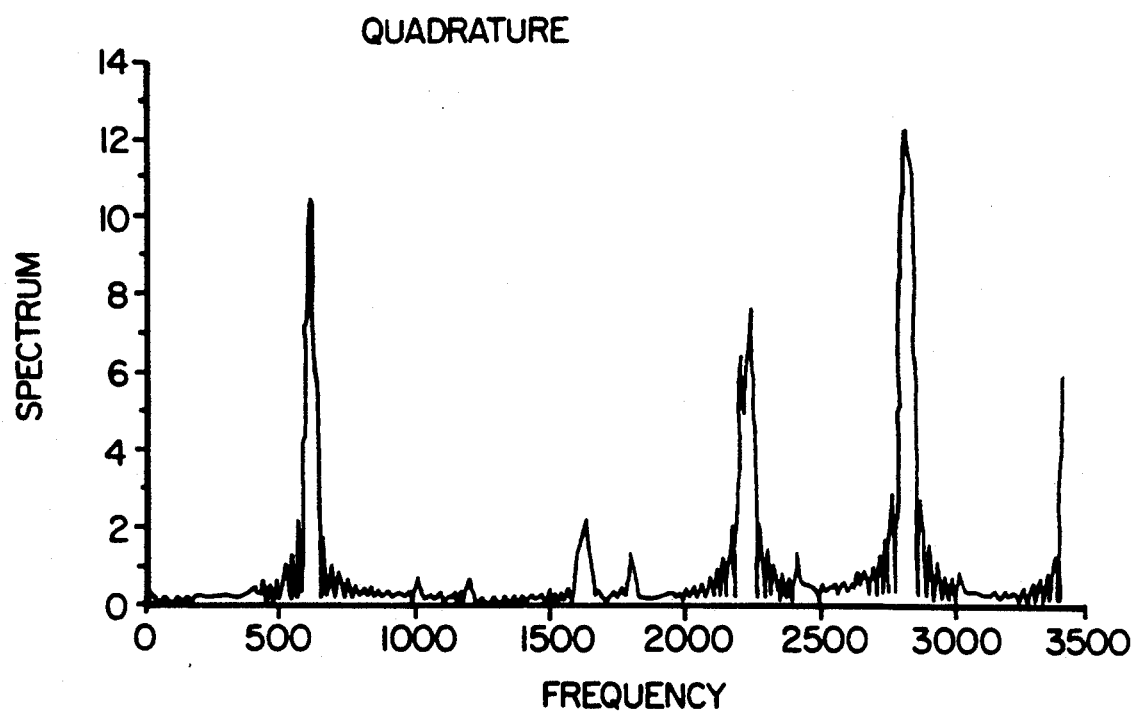
FIG. 6 is an output of the quadrature phase detector.

The quadrature phase detector is well suited for FSK detection and is provided at stage II. The sampling frequency represents the reference to which the two FSK frequencies are compared. The phase shift relative to one quarter of the sampling frequency is detected. The quadrature is a process by which the signal is multiplied by a delayed version of itself and therefore includes a unit delay 50 and a multiplier 52. The delay is of utmost importance and therefore the sampling frequency must not be changed. DC and low frequency inputs into the quadrature will generate frequencies close to the signal frequency at its output and are therefore hard to remove. DC and low frequencies must therefore be blocked from entering the quadrature process. The high pass filter described above is provided for this purpose. FIG. 6 shows the output of the quadrature in the frequency domain. The output signal's energy is concentrated in the 600 Hz peak. The 600 Hz represent the alternating mark/space sequence at 1200 baud. For random mark/space sequences the energy would be distributed between dc and 600 Hz if the rate is 1200 baud. Frequencies above 600 Hz must therefore be removed.

Figure 7:
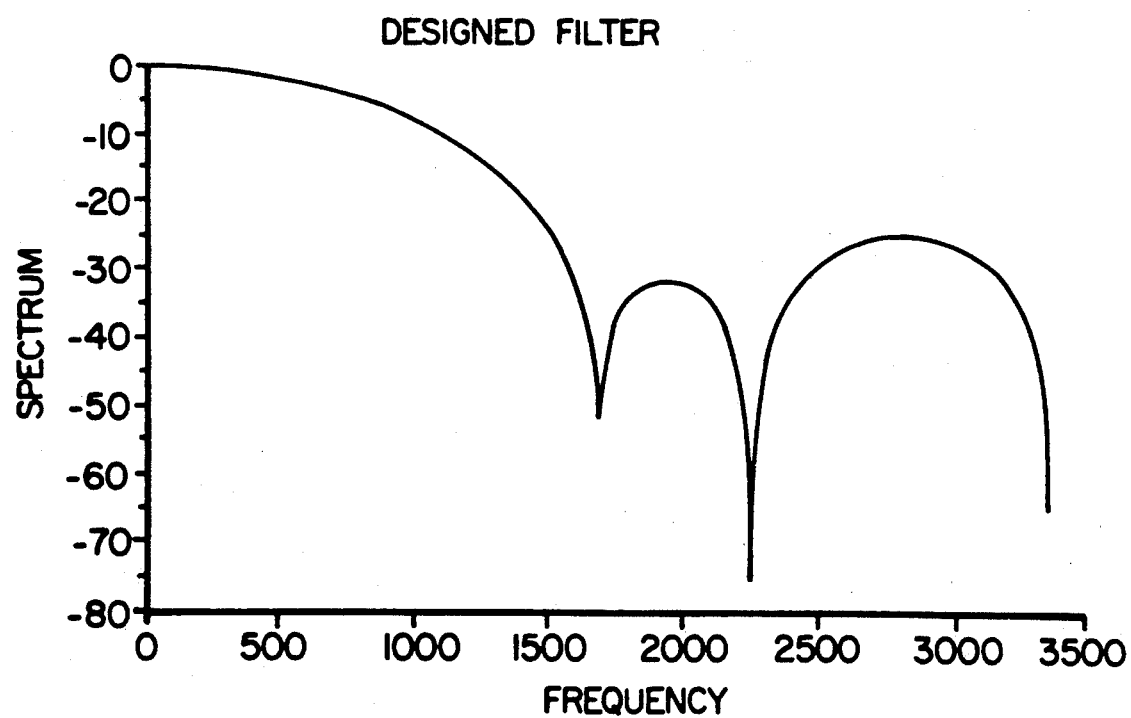
FIG. 7 is a graph showing designed frequency response characteristics of the low pass filter.
Figure 8:
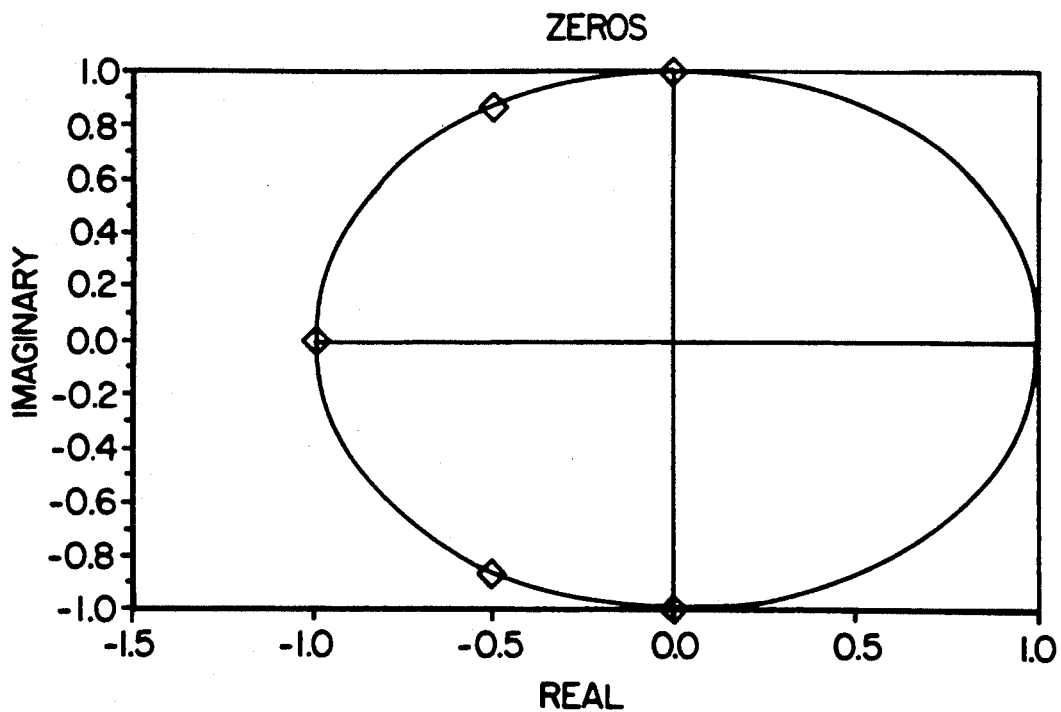
FIG. 8 shows the pole positions of the low pass filter.
Figure 9:
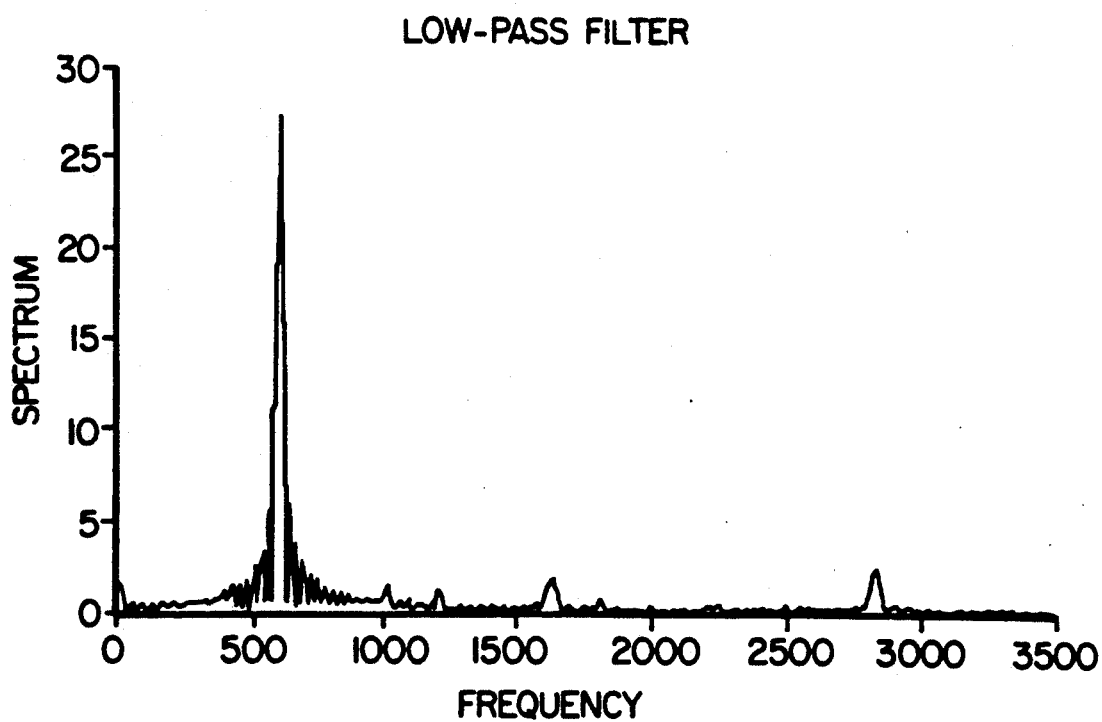
FIG. 9 shows an output of the low pass filter in the frequency domain of the FSK signal of FIG. 1.
Figure 10:
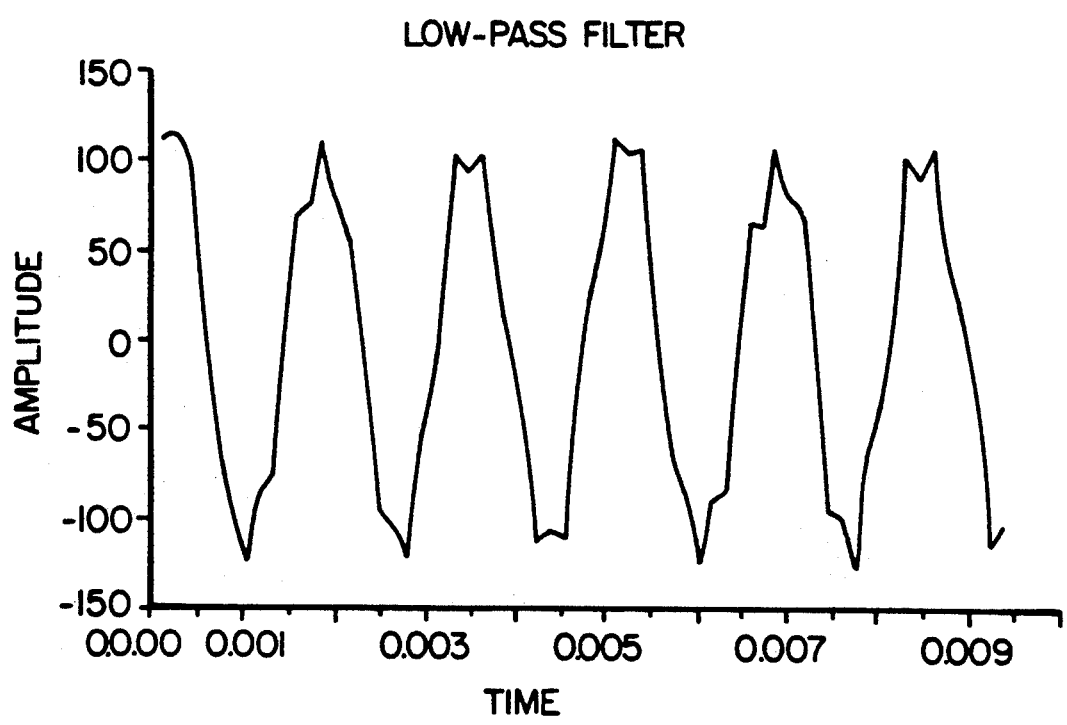
FIG. 10 shows the same output as that of FIG. 9 but shown in time domain.

The low pass filter at stage III functions to remove frequencies above 600 Hz from the quadrature output and consists of three filter sections, each made up of a combination of unit delays 60-68 and adders 70-74. The combined frequency response of all three low pass filter sections is seen in FIG. 7. Filter (1,1) followed by filter (1,1,1) and filter (1,0,1) also may be realised by the convolution product (1,2,3,3,2,1). The pole positions of the combined filter are shown in FIG. 8. The pole positions are carefully chosen to produce a zero multiplication filter realization. This is also important to minimize the hardware requirements. The frequency domain of the low pass filter's output is shown in FIG. 9. It should be noted that the higher frequencies are attenuated. FIG. 10 shows the time domain of the low pass filter's output. The "square wave" is the decoded representation for the alternating mark/space sequence at the output of the low pass filter. The closer this signal resembles a square wave, the better the signal's quality. This signal has to be centre sampled and referenced to an offset level. The offset level cannot be assumed to be zero because the spectrum may contain dc. Sideband equalisation will decrease the dc contents of the spectrum.

The offset generation is used to compensate the dc component and is shown in the Figure by an offset register 76 which, in this embodiment, sends a 32 bit offset level signal to a subtractor 78. After subtracting the offset level, the sign bit can be fed directly to a UART (Universal Asynchronous Receiver/Transmitter) receiver 80 for bit synchronization.

However, at a sampling rate of 6800 Hz and a rate of 1200 baud, there are 5.667 samples per bit and the fractional part of 0.667 will create chitter or jitter at the UART's input. As a further improvement therefore, in order to reduce the chitter the sampling frequency may be doubled at this stage (stage V shown in a dotted box as an option). The sampling doubler 82 which may be provided here for this purpose as a further embodiment may consist of a unit delay 84, an adder 86, and a selector (an electronic switch) 88. The sampling rate is doubled using 50% zero filling followed by a low-pass filter to eliminate the spectral mirror image. Thus the switch 88 operates at twice the sampling frequency to select alternately the sampled data signal and an interpolated signal which is sent to the UART receiver 80 in the proper order. The actual hardware is realized by a polyphase filter.

The present invention uses the fractional two's complement representation and sequential processing of the signal. Furthermore, by taking advantage of the specific speed requirements of a modem, the hardware implementation can be further simplified as will be discussed below. Thus, in the following embodiment, data samples are received at 6800 Hz or every 147 μs. This is more than enough time to do all operations sequentially. This will significantly reduce the hardware requirements and cost as simple and well proven hardware elements can be used for the design and production of a chip of the present invention. As seen below, the hardware implementation can be realized by the use of only simple shift registers, adders and latches and requires the minimum number of multipliers.

Figure 11:
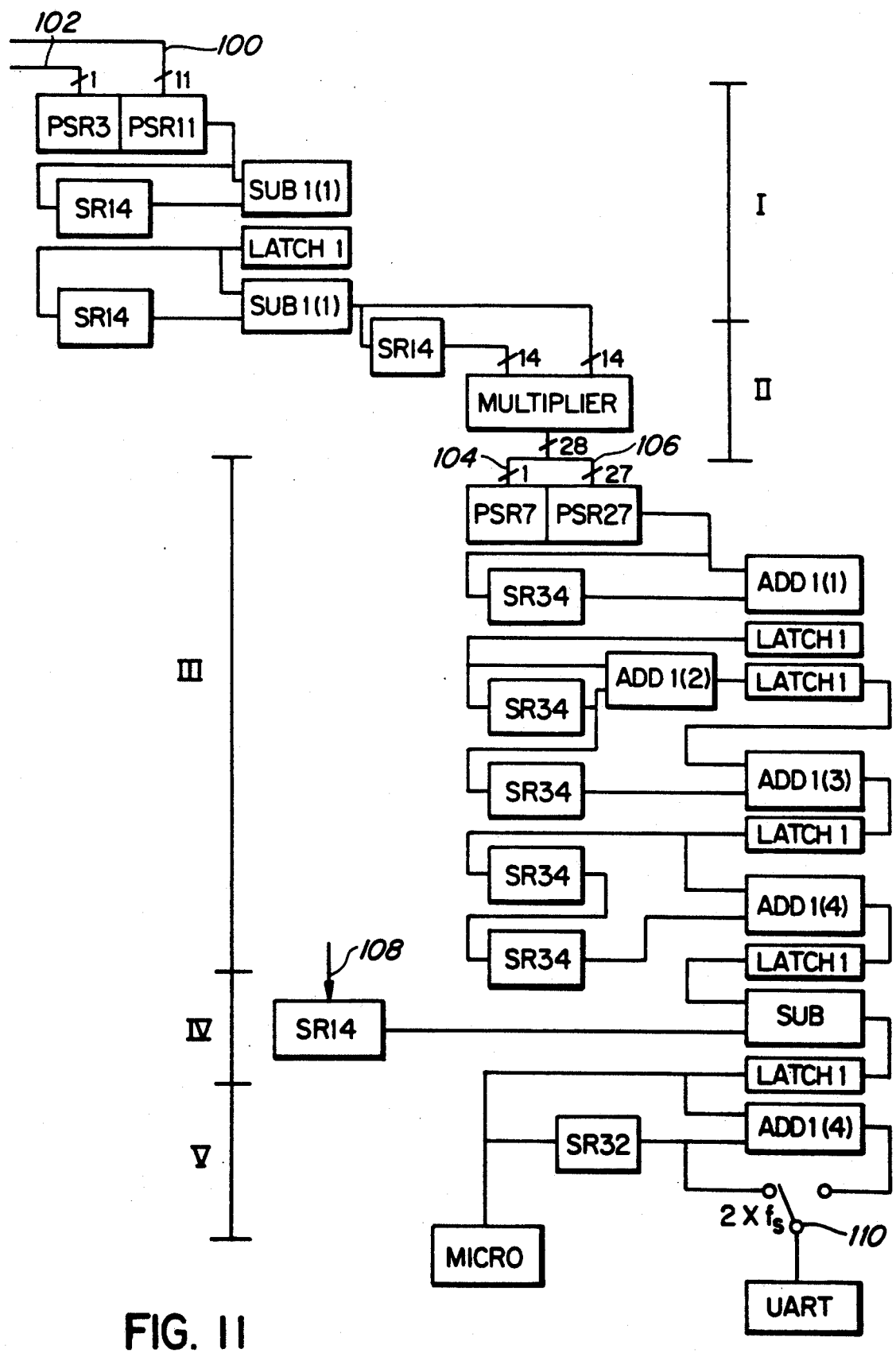
FIG. 11 is a block diagram depicting a demodulator according to one of the preferred embodiments of the present invention.

Referring now to FIG. 11, an embodiment is illustrated in which stages I to V correspond to those of FIG. 3. In the Figure, PSR3, PSR11, PSR27 or PSRn indicates 3-bit, 11-bit, 27-bit and n-bit parallel shift registers. SR14, SR34 or SRn depicts 14-bit, 34-bit or n-bit shift registers. ADD1, SUB1 and LATCH1 are a 1-bit adder, 1-bit subtractor and 1-bit latch.

The 12 bit data sample is loaded into the parallel shift registers PSR3 and PSR11 of stage I (high pass filter) which further includes two shift registers SR14, subtractors SUB1 and a latch LATCH1. Of 12 bits of the data sample, 11 bits are loaded into PSR11 via path 100, the least significant bit first and the most significant bit last. The 1-bit sign bit is loaded into 3 positions of PSR3 via path 102, that is to say, sign bit 1 is loaded as 111 and 0 sign bit as 000. This is equivalent to dividing the input by 4 to make space for a possible overrun generated by the subtraction. The two extra positions correspond to two substractions because each subtraction operation may generate one bit overrun. It should be noted that PSR3 and PSR11 are in a single 14 bit shift register in which three positions are set aside for the sign bit. The 14 bit output of the high pass filter is fed to the quadrature phase detector (stage II) which includes SR14 and a multiplier. The multiplier can be any type of two's complement multipliers including a simple shift and add multiplier. The output of the quadrature detector, i.e. the multiplier, is in 28 bits and is fed to stage III (low pass filter).

The low pass filter includes PSR7, PSR27, 5 SR34, 4 ADD1 and 4 LATCH1. The first bit of 28 bit output is the sign bit and it is loaded into 7 positions of PSR7 through path 104 and the remaining bits into PSR27 through path 106, from the least significant bit first to the most significant bit last. The sequential output of the PSR7 and PSR27 is therefore the least significant bit of the data bits first, to the most significant bit last, followed by the sign bit in the same order.

The offset generator is stage IV and has an offset register, a subtractor, and a latch. The offset register is either hardwired or a register which is under control of a microprocessor by way of path 108, in the latter case, the offset level can be readily and, if preferred, dynamically adjusted. Among various ways of determining the offset level, one method which can be used is as follows. In the special telephone environment, a long continuous signal stream of alternating mark and space is provided at the beginning of the "class burst". In such a case, the output of the low pass filter can be integrated and averaged over time. The integration of aperiodic signal will produce the dc level of the signal's spectrum. This dc level is used as reference (the offset level) for the remaining signal of the "class burst".

The stage V is the sampling frequency doubler and is not essential for the operation of the demodulator of the present invention. However, as stated earlier it improves the performance by reducing the chitter or jitter. The sampling doubler includes a shift register, an adder and a switch (or a selector) 110. The shift register and the adder produce the sampled data signal and the interpolated signal of the two adjacent sampled data signals. The switch which is operated at twice the sampling frequency collects both the sampled data signal and the interpolated signal. The output of the switch is thus the data signal, which is sampled at twice the sampling frequency. It is then sent to a UART, which is well known hardware universally used in modems. The signal sent to the UART is either one or zero which is derived from the sign bit part of the output of the sampling doubler.

The analysis of quantisation errors and overflow is particularly simple since the circuit is not recursive. An addition or subtraction can produce one bit overrun. Therefore a pre-scaling of one bit and a register length increase of one bit will eliminate overrun and quantisation noise completely. A multiplication will not produce an overrun condition. Quantisation noise is generated unless the register is long enough to hold the product.

High pass filter—2 addition (equivalent of subtraction)

Quadrature—1 multiplication

Low pass filter—5 additions

The circuit discussed so far generates zero overrun and quantisation noise.

As can be seen in this embodiment, the hardware used is simple, reliable and has well proven elements. It is therefore very easy and economical to fabricate into ICs.

We claim:

1. A digital FSK demodulator for demodulating a PCM coded digital signal representing mark and space frequency components of an analog FSK signal, comprising:

high pass filter means for filtering out low frequency components of said digital signal;

quadrature phase detector means connected to said high pass filter means for detecting the mark and space frequency components of said digital signal by detecting their phase shift in relation to a sampling frequency and for producing a digital detector signal; and low pass filter means connected to said quadrature detector means for filtering high frequency components of said digital detector signal to produce a processed digital signal indicating the baseband information in the digital form.

2. The digital demodulator according to claim 1, wherein said PCM coded digital signal is coded using the fractional two's complement number system and said demodulator further comprising a parallel shift register for receiving said PCM coded digital signal and for outputting said received digital signal sequentially one bit after another to said high pass filter means in the order of the least significant bit first to the most significant bit last.

3. The digital demodulator according to claim 2, further comprising:

offset level generator means connected to said low pass filter means for compensating the dc balance of said processed digital signal.

4. The digital demodulator according to claim 3, further comprising:

sampling frequency doubler means connected to said low pass filter means for sampling said processed digital signal at twice said sampling frequency to produce a demodulator signal.

5. The digital demodulator according to claim 2, wherein said high pass filter means comprises two unit delay operators and two subtractors connected in cascade, said quadrature phase detector means comprises a unit delay operator and a multiplier and said low pass filter means comprises a plurality of unit delay operators and a plurality of adders arranged in a plurality of sections connected in cascade.

6. The digital demodulator according to claim 5, wherein said unit delay operators are made of shift registers.

7. The digital demodulator according to claim 3, wherein said offset level generator means includes an offset register for holding an offset level signal to be used for compensation of the dc balance of said processed digital signal.

8. The digital demodulator according to claim 7, wherein said offset level signal is adjustable for adjustable compensation of the dc balance of said processed digital signal.

9. The digital demodulator according to claim 4, wherein said sampling frequency doubler means comprises a shift register, an adder and a switch.

* * * * *